Dec. 27, 1955  
M. S. GETTIG  
AUTOMATIC CONTROL SYSTEM FOR PIPE MACHINING APPARATUS AND THE LIKE  
2,728,253

Filed April 3, 1952  
12 Sheets-Sheet 1

INVENTOR.  
MARTIN S. GETTIG  
BY  
ATTORNEY

Dec. 27, 1955
M. S. GETTIG
2,728,253
AUTOMATIC CONTROL SYSTEM FOR PIPE
MACHINING APPARATUS AND THE LIKE
Filed April 3, 1952
12 Sheets-Sheet 2
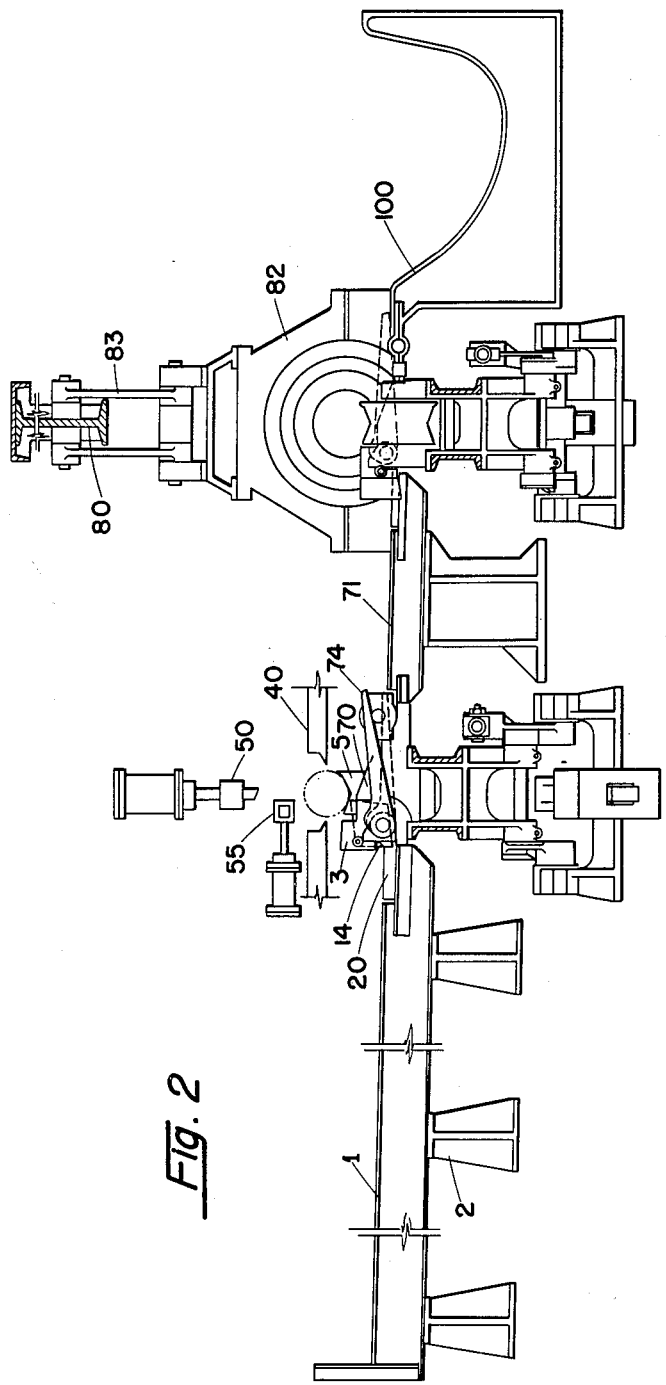
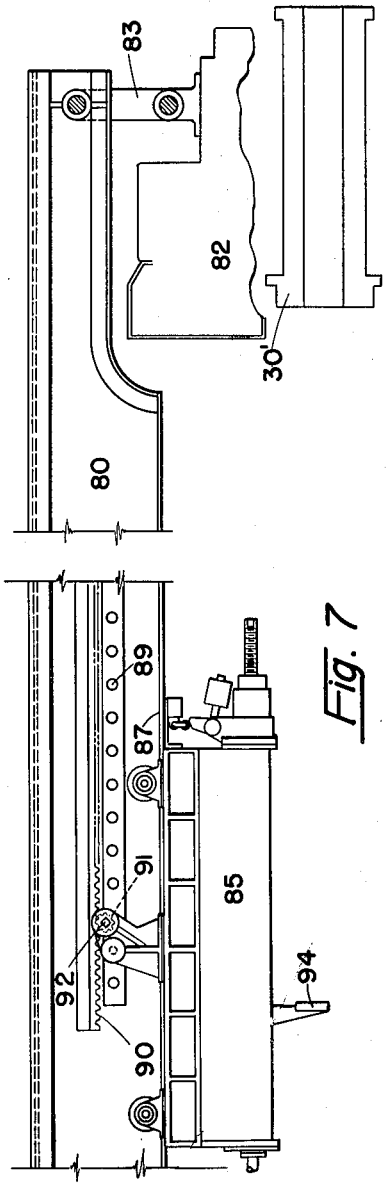
INVENTOR.
MARTIN S. GETTIG
BY
*George K. Helbert*
ATTORNEY Dec. 27, 1955
M. S. GETTIG
AUTOMATIC CONTROL SYSTEM FOR PIPE
MACHINING APPARATUS AND THE LIKE
2,728,253
Filed April 3, 1952
12 Sheets-Sheet 3
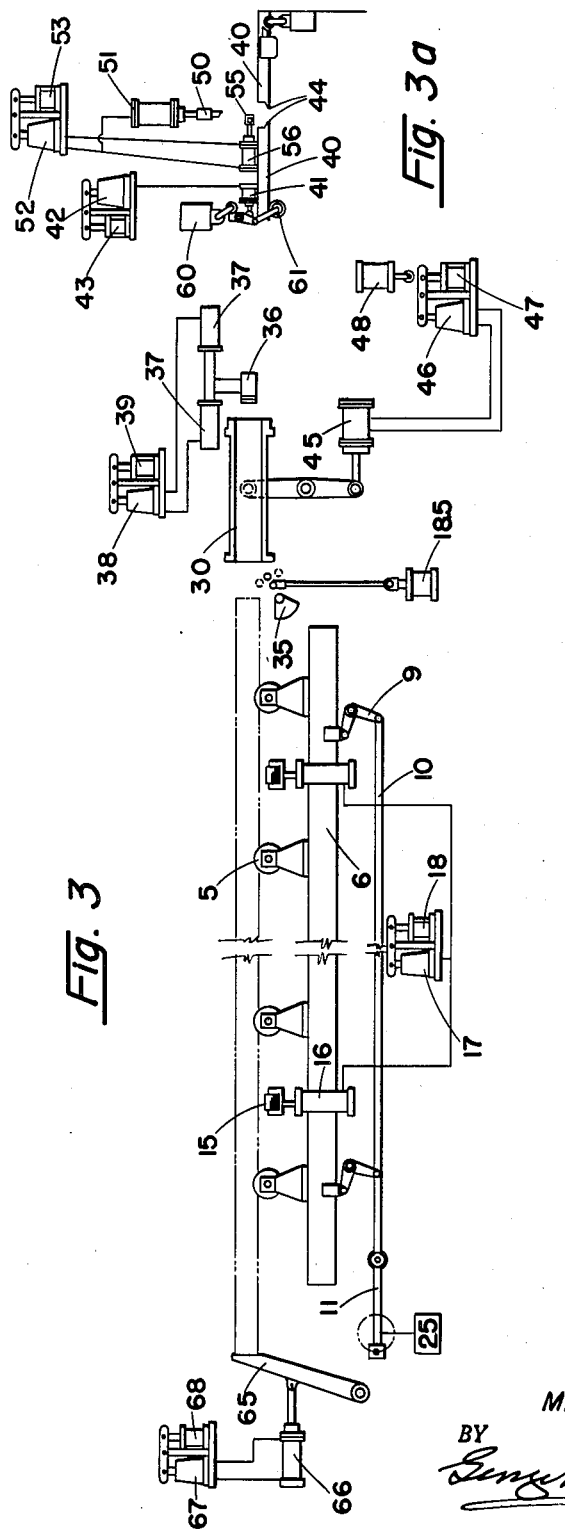
INVENTOR.
MARTIN S. GETTIG
BY
ATTORNEY

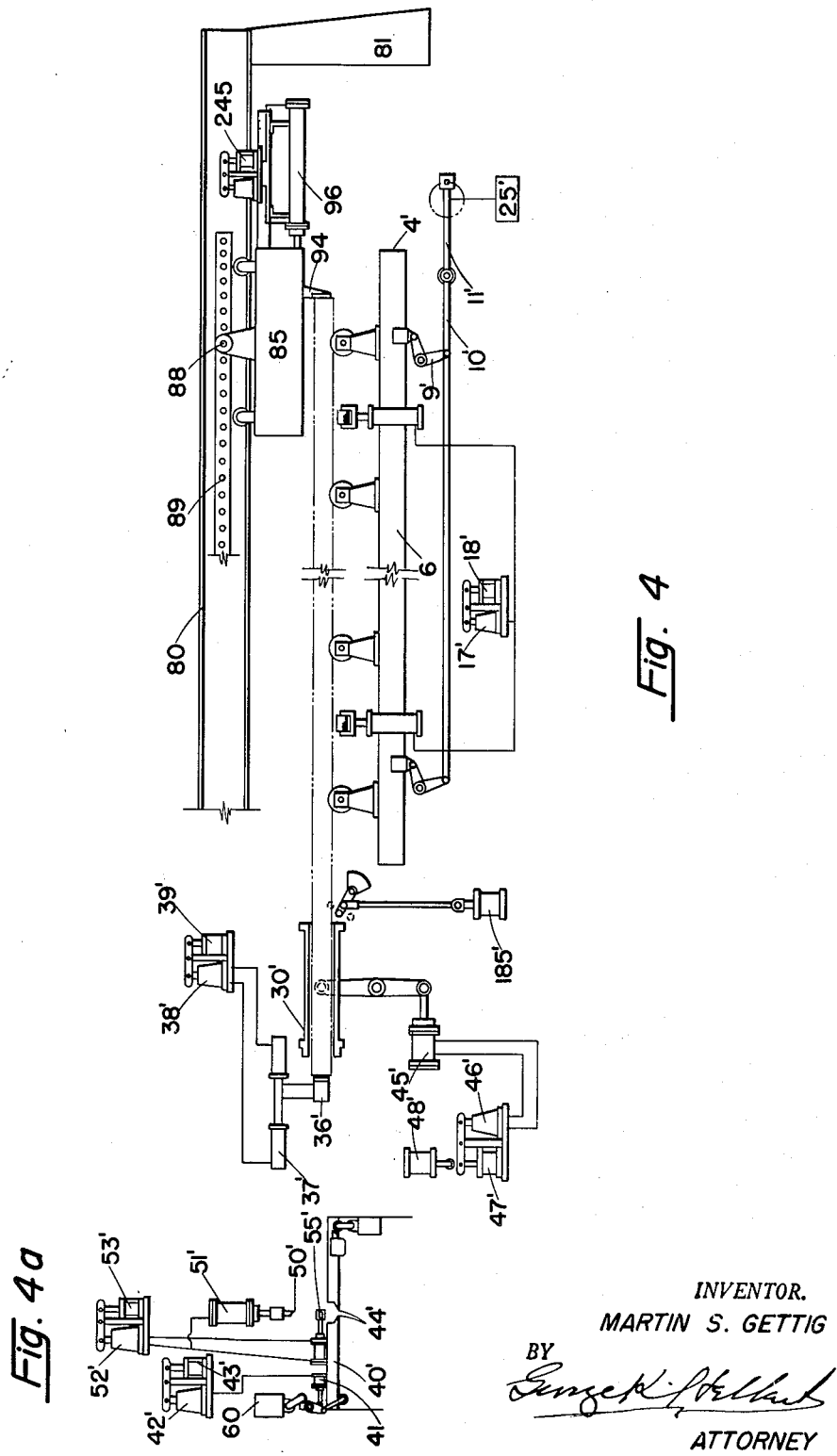

Dec. 27, 1955
M. S. GETTIG
2,728,253
AUTOMATIC CONTROL SYSTEM FOR PIPE
MACHINING APPARATUS AND THE LIKE
Filed April 3, 1952
12 Sheets-Sheet 5
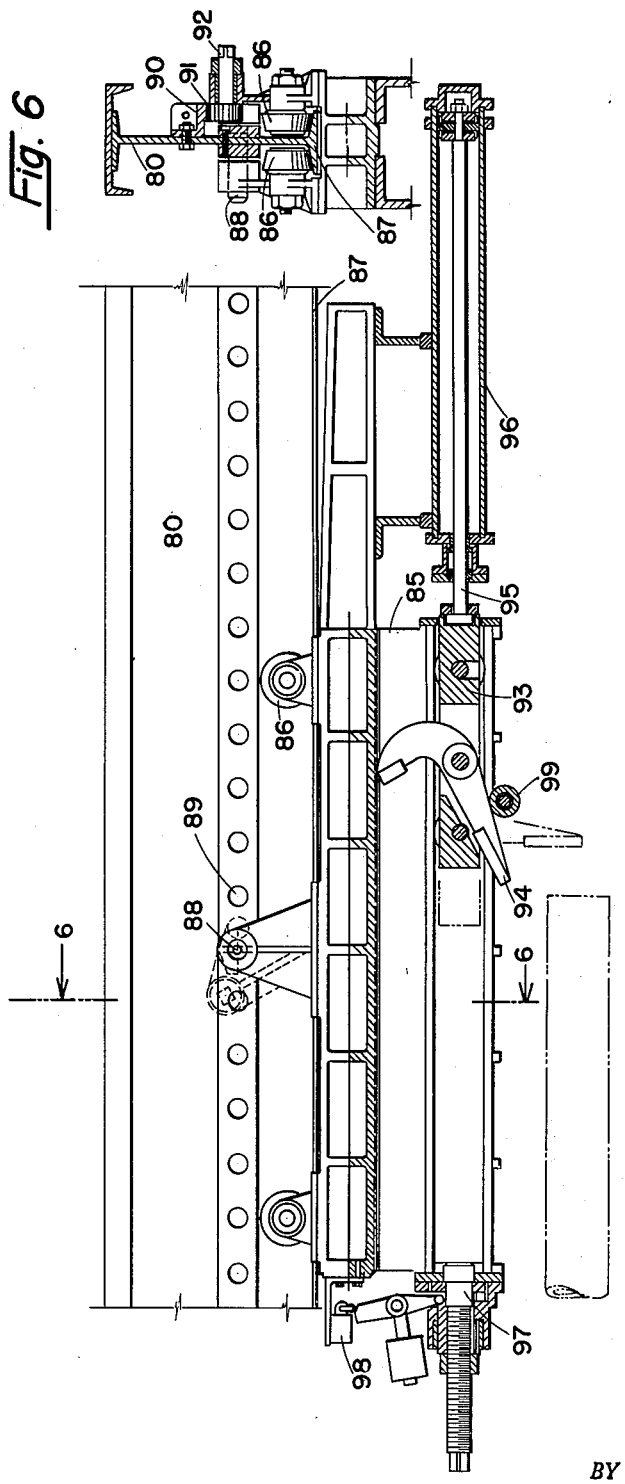
INVENTOR.
MARTIN S. GETTIG
BY
*[signature]*
ATTORNEY

INVENTOR.
MARTIN S. GETTIG
BY
ATTORNEY

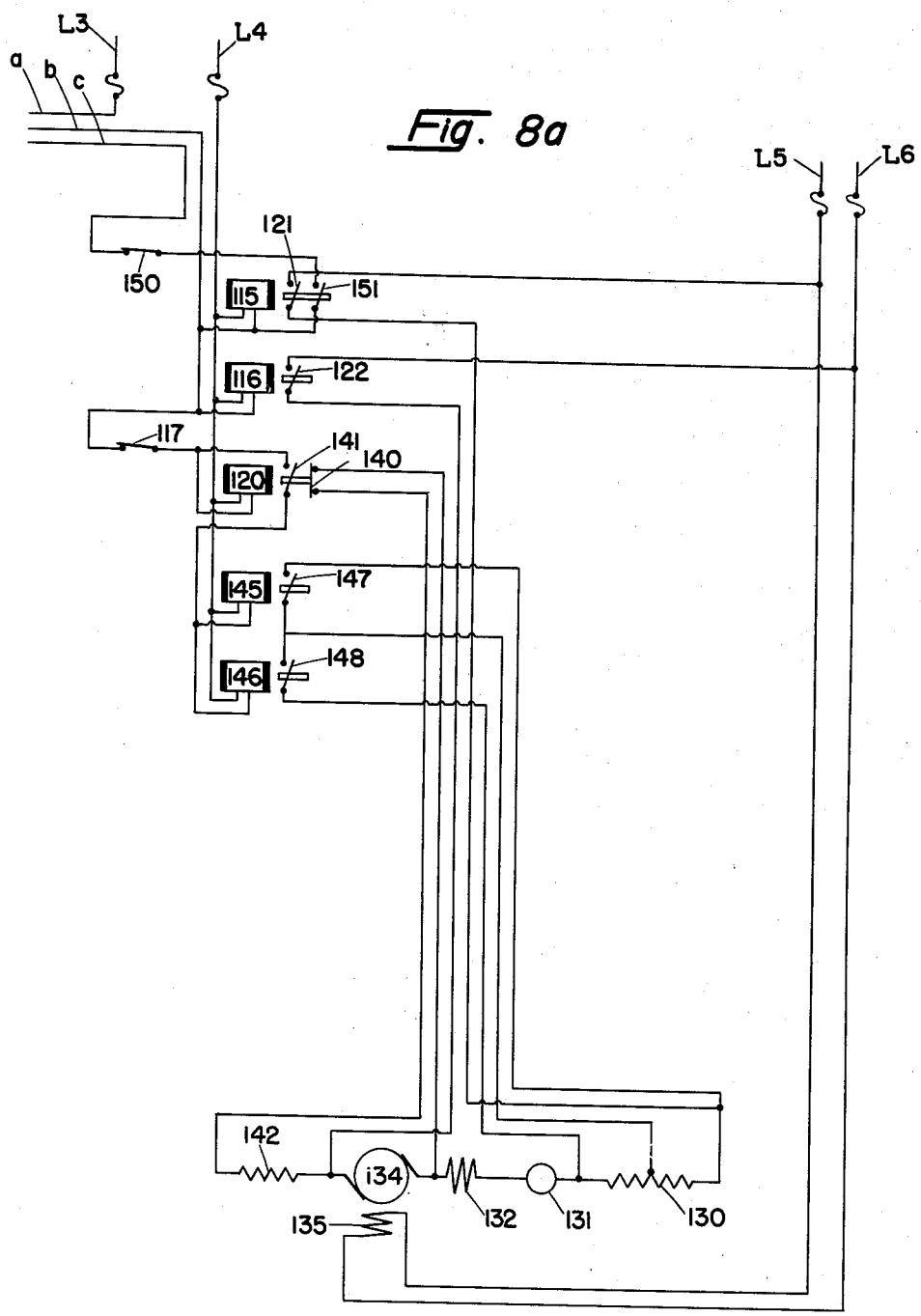

INVENTOR.
MARTIN S. GETTIG

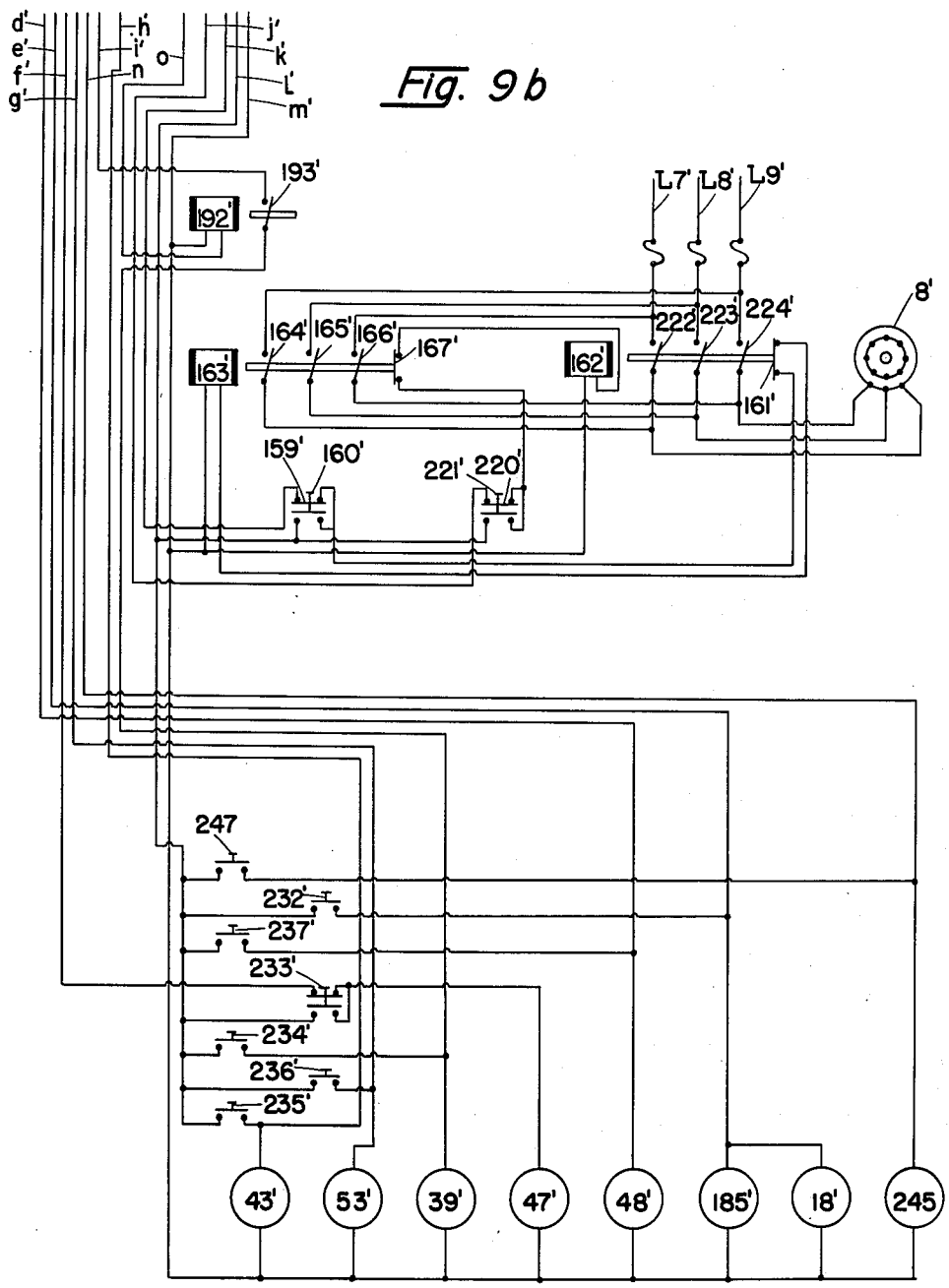

Dec. 27, 1955

M. S. GETTIG 2,728,253

AUTOMATIC CONTROL SYSTEM FOR PIPE
MACHINING APPARATUS AND THE LIKE

Filed April 3, 1952

INVENTOR.
MARTIN S. GETTIG

BY

ATTORNEY

INVENTOR.
MARTIN S. GETTIG
ATTORNEY

United States Patent Office 2,728,253
Patented Dec. 27, 1955

2,728,253
AUTOMATIC CONTROL SYSTEM FOR PIPE MACHINING APPARATUS AND THE LIKE

Martin S. Gettig, Poland, Ohio

Application April 3, 1952, Serial No. 280,428

5 Claims. (Cl. 82—2.5)

This invention relates to automatic controls for machines of the type used for finishing the ends of sections of pipes, tubes and the like generally preparatory to threading by operations which include cutting off the ends to reduce the sections to uniform length and may be embodied in a system of a nature generally comparable to the automatic control system for pipe threading machines and the like disclosed in U. S. Letters Patent 2,210,531, granted August 6, 1940, to Harold G. Engelbaugh, Martin S. Gettig and Clifton R. Coburn, the machine to which the present invention is particularly directed being designed to operate upon the pipe sections before they are introduced to the threading machine to facilitate the operation of the latter upon them, for convenience of description the individual lengths of pipe or tube being hereinafter generically designated as "pipe."

In modern pipe mills, particularly those generating pipe at relatively high speeds, the pipe as it issues from the mill is cut into sections by a flying saw or other suitable mechanism but it is substantially impossible for such mechanisms to produce a series of pipes precisely uniform in length; the severed ends of the pipes are moreover often somewhat rough and burred and hence unsuitable for reception in a pipe threading machine without a preliminary chamfering while reaming of the inner edge of the pipe end is also a normal practice before threading to remove internal burrs produced by the cutoff mechanism.

Machines have been devised for receiving pipes and successively cutting off their ends, reaming and chamfering them under manual control of operatives in charge of control desks each containing a plurality of switches, levers or the like which must be operated in the proper sequential order to activate the various mechanisms for carrying out their respective functions. These machines usually comprise two relatively independent operating units, hereinafter designated respectively the "lead" and "lag" units, with transfer means between them, each unit being adapted for cutting off, reaming and chamfering one end of each pipe as the pipes are successively introduced to the machine and each unit normally requiring the substantially continuous attention of at least one operator in order to insure the proper timing and sequential operation of its various elements to maintain its maximum productive output.

In general such machines include an inclined charging table adjacent the first or lead unit adapted to receive a plurality of pipes deposited thereon from time to time and allow the individual pipes to pass sequentially by gravity to a stop over which each in its turn is lifted by lift mechanism actuated in conjunction with a conveyor forming an element of the unit whereby when appropriate controls are manipulated the leading pipe is transferred laterally to the conveyor as the latter is raised to receive and lift it to the higher level required for subsequent operations. The conveyor then translates the pipe axially and introduces its leading end into a machining unit including a grip for seizing the pipe and rotating it about its axis and machining tools for cutting it off into a plane normal thereto and then reaming and chamfering the inner and outer edges of its end. To permit the pipe to be rotated by the grip during these operations jack rolls rotatable about axes parallel to that of the pipe are interposed between adjacent rolls of the conveyor and provided with elevating mechanism whereby they may be raised to lift the pipe from the conveyor sufficiently to clear it. After the machining operations upon the said end of the pipe have been properly carried out under the control of the operator of the lead unit the pipe is returned to the conveyor and ejected from it to a transfer table over which it rolls by gravity to the second or lag unit where its other end is cut and machined by generally similar tools under the control of another operator and the pipe then discharged to a receiving bin.

It is evident that a large number of substantially independent switches, levers and the like are required for operating the several elements of each unit and not only must they be actuated in proper sequence but also the starting and stopping of each element requires accurate timing. For example, when the motor driving the conveyor lifting mechanism is actuated to raise the conveyor it must be stopped when the pipe has reached the proper level above that at which it is received on the conveyor, another motor then energized to drive the conveyor rolls to move the pipe axially and unless a limiting stop is provided the conveyor roll motor must be deenergized at the proper moment to stop the section in position for actuation of the cut off tools to enable the latter when later moved radially inward to sever the pipe in a plane normal to its axis without removing an excess quantity of material. Similar accurate control of each of the several other operating mechanisms is also essential since careless manipulation and/or faulty observation of the relation of the pipe to the machine may for example result in an unfinished end being improperly acted upon by the machine, or even not acted upon at all.

It results that with such a machine a satisfactory production rate within acceptable length and other tolerances can be attained only by constant and careful attention by the operatives to the large number of controls and to their timing and sequence of operation as any delay or error in the functioning of any element of the machine as a whole may not only seriously impede normal production but also possibly result in damage to one or more pipes and/or parts of the machine itself.

In accordance with the present invention however the entire machine operates automatically once it has been set in motion and normally requires attention only sufficient to insure the maintenance of a supply of pipes on the charging table and removal of the finished ones from the receiving bin before the latter has been filled beyond its capacity, the controls embodied in the machine being such as to insure operation of the various constituent elements in proper sequential order and with precise timing under the influence of the pipes themselves, and/or mechanical timing elements which are brought into play automatically once the system is energized; their operation moreover is automatically suspended on exhaustion of the supply of incoming pipes to either unit or failure of any element of the machine to function as intended.

A pipe cutting off machine to which the invention is particularly applicable is indicated diagrammatically in the drawings to permit a showing of the relation thereto of mechanism more particularly embodying the invention but it will of course be understood the invention is equally adapted for incorporation in substantially any machine of this same general character and in the following description references to the said pipe cutting off machine will be understood as only for the purpose of facilitating disclosure of the invention without restricting the latter thereto or confining its use to any particular one.

It is therefore a principal object of the invention to provide an improved controlling and operating system for machines of the aforesaid general character whereby completely automatic operation may be attained.

A further object is to provide such an automatic control system effective to cause a machine supplied with pipes of different lengths to reduce all of them to a common predetermined length in connection with the operations incident to reaming and chamfering their ends.

A still further object is to provide in such control system manually operated means for causing either unit of the machine to omit reaming and chamfering as to any one or a plurality of successive individual pipes and to resume full operation on succeeding ones automatically upon reverse actuation of such means at each unit whereby the operator may at will suspend reaming and chamfering of either or both ends of one or more pipes he may select.

Other objects, purposes and advantages of the invention will hereinafter more fully appear or will be understood from the following description of one embodiment of it in which reference will be had to the accompanying drawings which are largely diagrammatic, particularly as concerns the general structure of those mechanical elements of the machine identical with or substantially similar to corresponding elements of machines heretofore utilized for similar purposes under manual control.

In the said drawings:

Fig. 2 is a fragmentary somewhat diagrammatic transverse section of the machine in greater detail and on a larger scale on the line 2—2 in Fig. 1 also showing the relative position with respect to the pipe of the machining tools which first operate thereon.

Fig. 3 is a fragmentary side elevation looking in the direction of like travel of that unit of the machine hereinafter designated the "lead" unit which receives the entering pipes and operates upon them before delivering them to the transfer table for subjection to the appropriate operations of the other or "lag" unit.

Fig. 3a is a diagrammatic fragmentary representation on a transverse vertical plane showing certain mechanisms associated with the unit illustrated in Fig. 3.

Fig. 4 is a view generally corresponding to Fig. 3 of the lag unit of the machine and Fig. 4a illustrates in the manner of Fig. 3a certain of the elements incorporated in that unit.

Fig. 5 on a considerably larger scale and in greater detail than any of the preceding figures is a fragmentary side elevation partly in section of the mechanism utilized for positioning the pipes longitudinally in the lag unit preparatory to severing their ends to reduce them to precisely the desired length.

Fig. 6 is a fragmentary section on the line 6—6 in Fig. 5 showing further details of the said positioning mechanism.

Fig. 7 is a fragmentary side elevation on a smaller scale of the pusher mechanism illustrated in Fig. 5 and its supporting structure.

Figure 1:
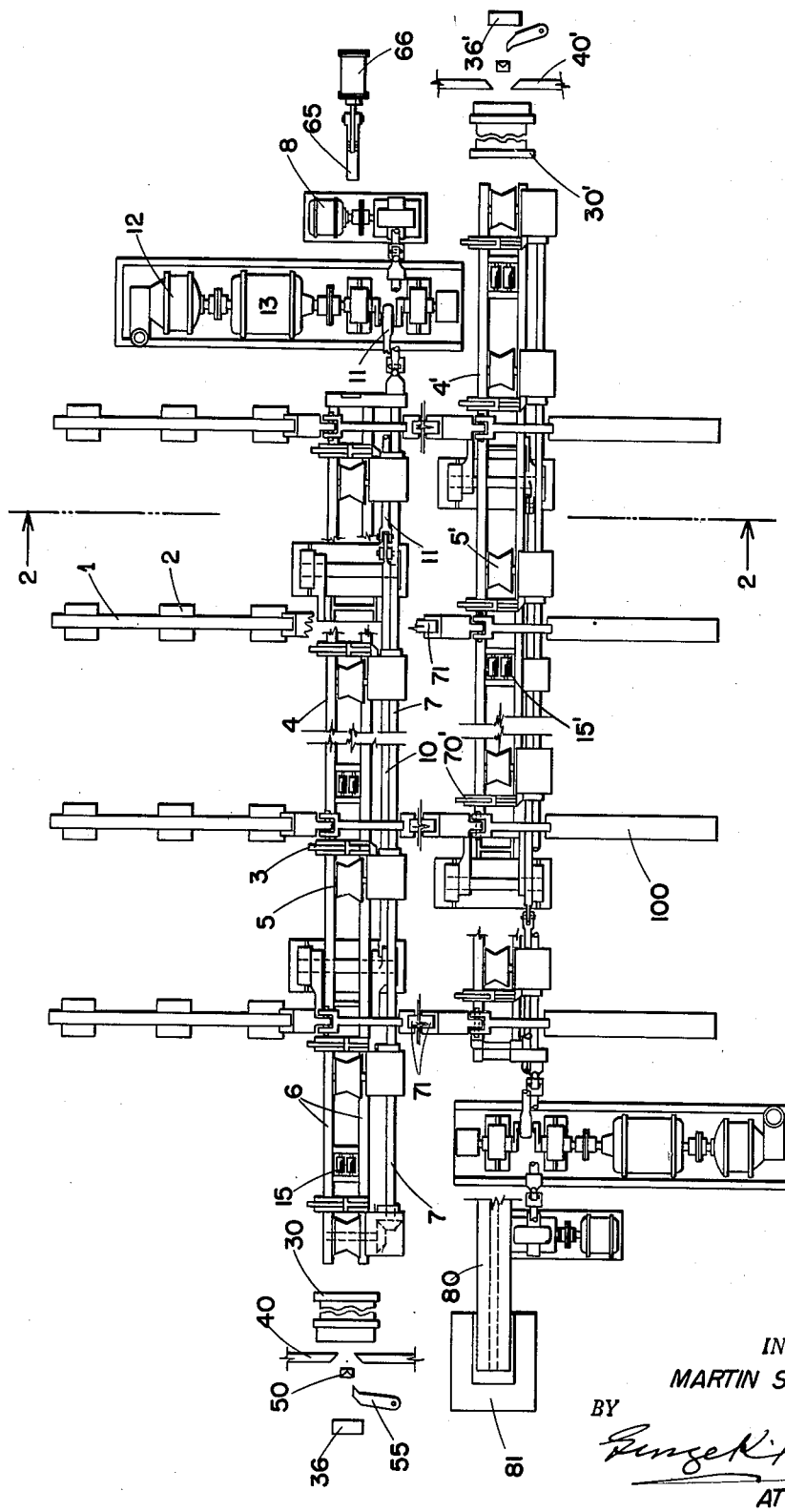
Fig. 1 is a fragmentary diagrammatic top plan view of the machine and associated mechanisms showing generally the relationship to each other of the principal mechanical elements without particular regard to the specific details of their construction.
Figure 8:
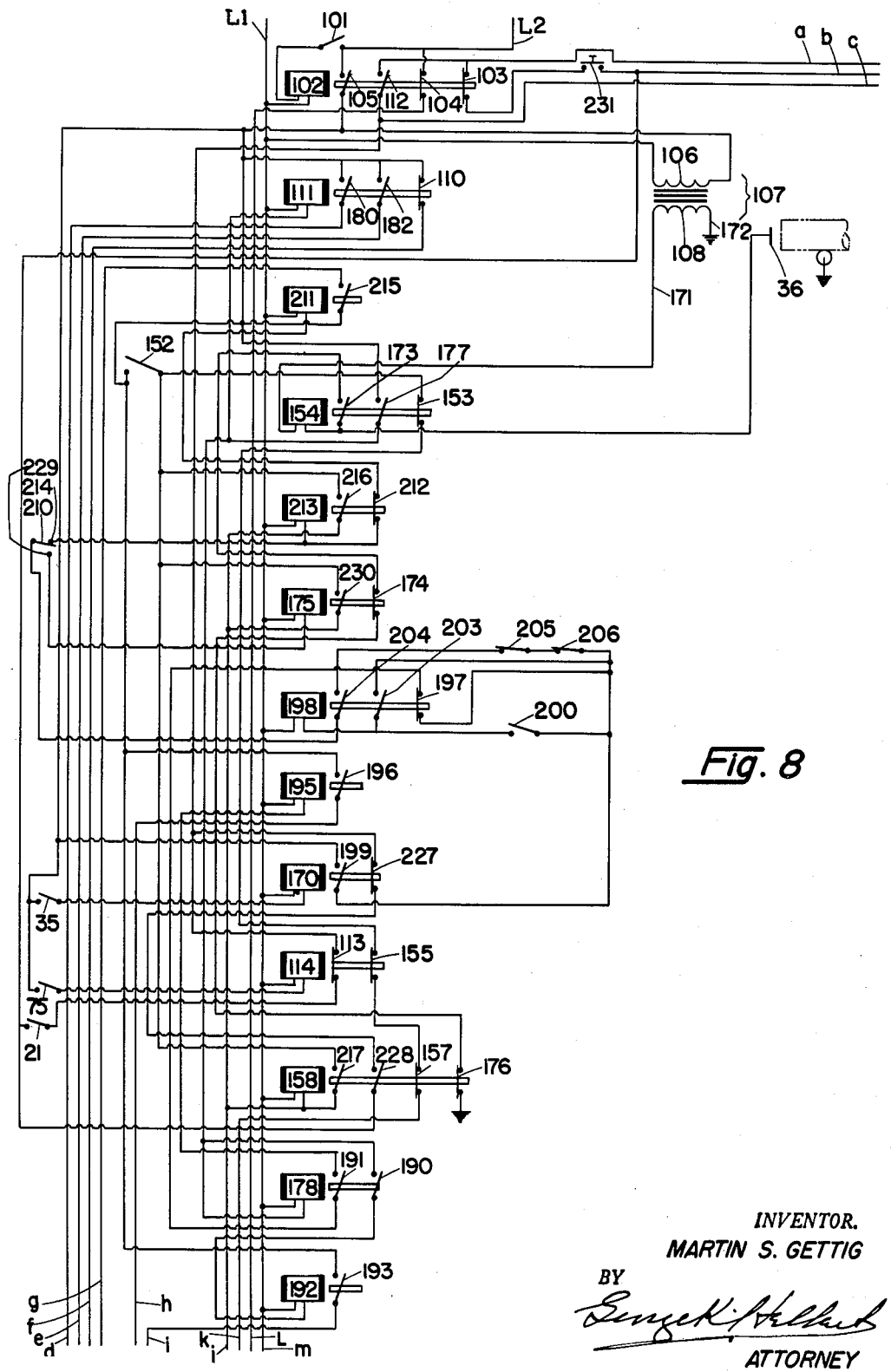
Figure 8B:
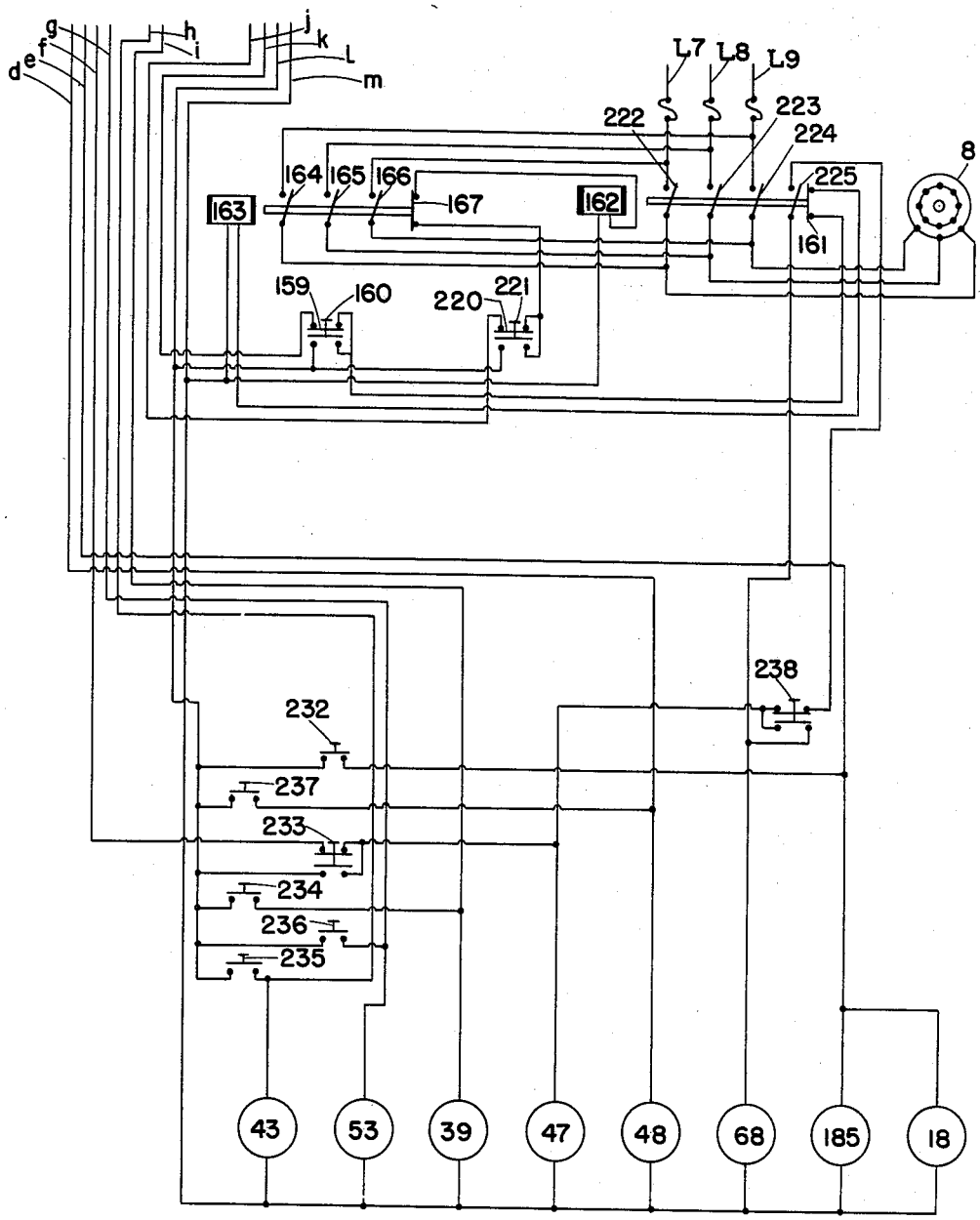

Figs. 8, 8a and 8b together represent diagrammatically the circuits utilized for controlling the several components of the lead unit of the machine, the circuits in Fig. 8 being connected with those in Fig. 8a through conductors designated a, b, and c respectively in both figures and the circuits in Figs. 8 and 8b being connected through conductors designated d, e, f, g, h, i, j, k, l and m respectively in both figures; Figs. 8, 8a and 8b are thus to be read as if all were parts of a single wiring diagram.

Figure 9:
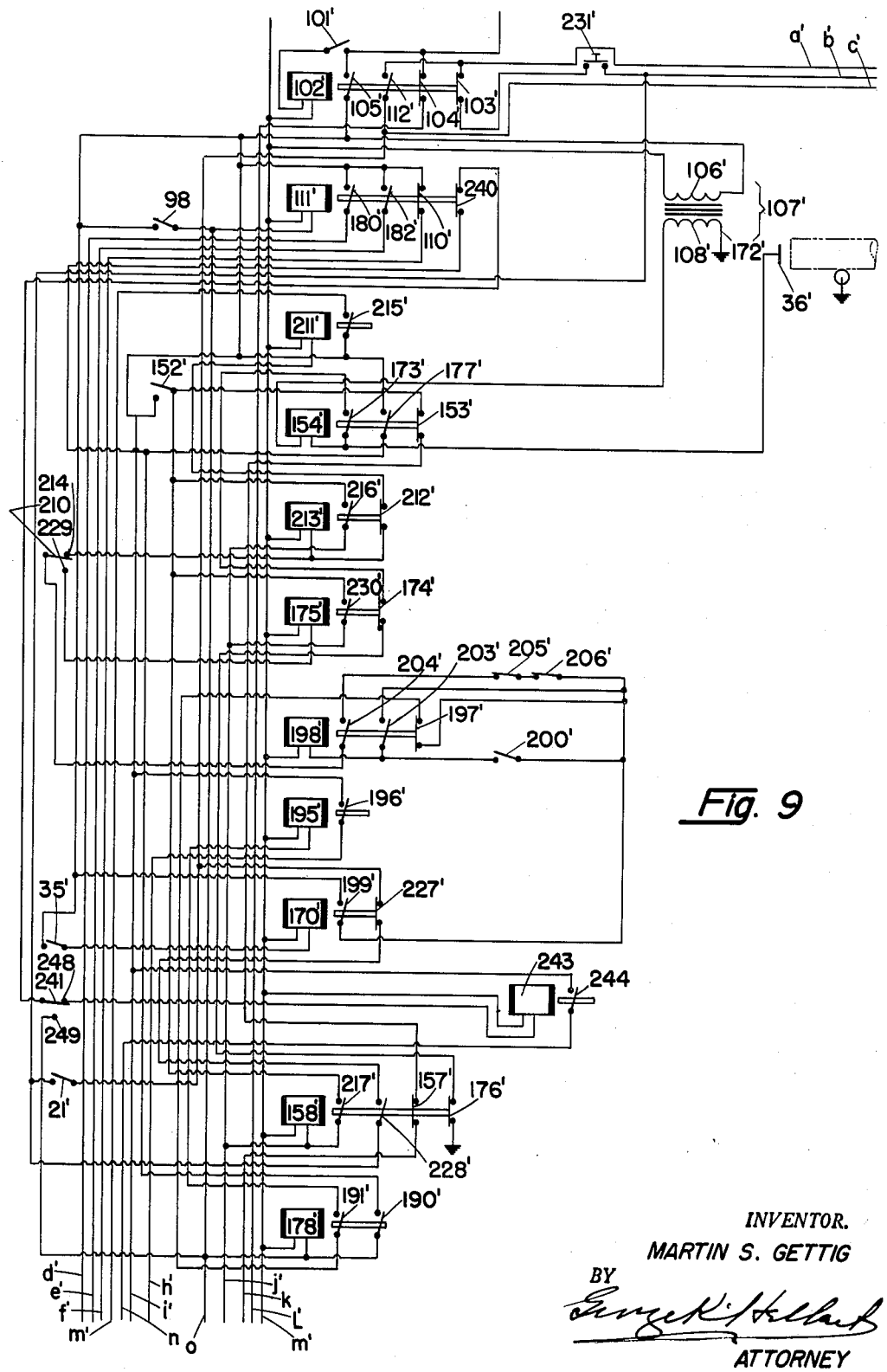

Figs. 9 and 9b are likewise to be considered as parts of a corresponding wiring diagram showing the controls for the lag unit of the machine; these figures are to be read in conjunction with Fig. 8a as if each reference character therein had been supplied with a prime (') to indicate association with the lag unit since all circuits and instrumentalities represented in said Fig. 8a are identical for the two units, which to this extent are exact duplicates of each other. While Figs. 9 and 9b bear certain resemblances to Figs. 8 and 8b respectively, and are to be read in the same way as components of a single diagram, differences between them will be pointed out as the description proceeds.

Figures 10, 10A:
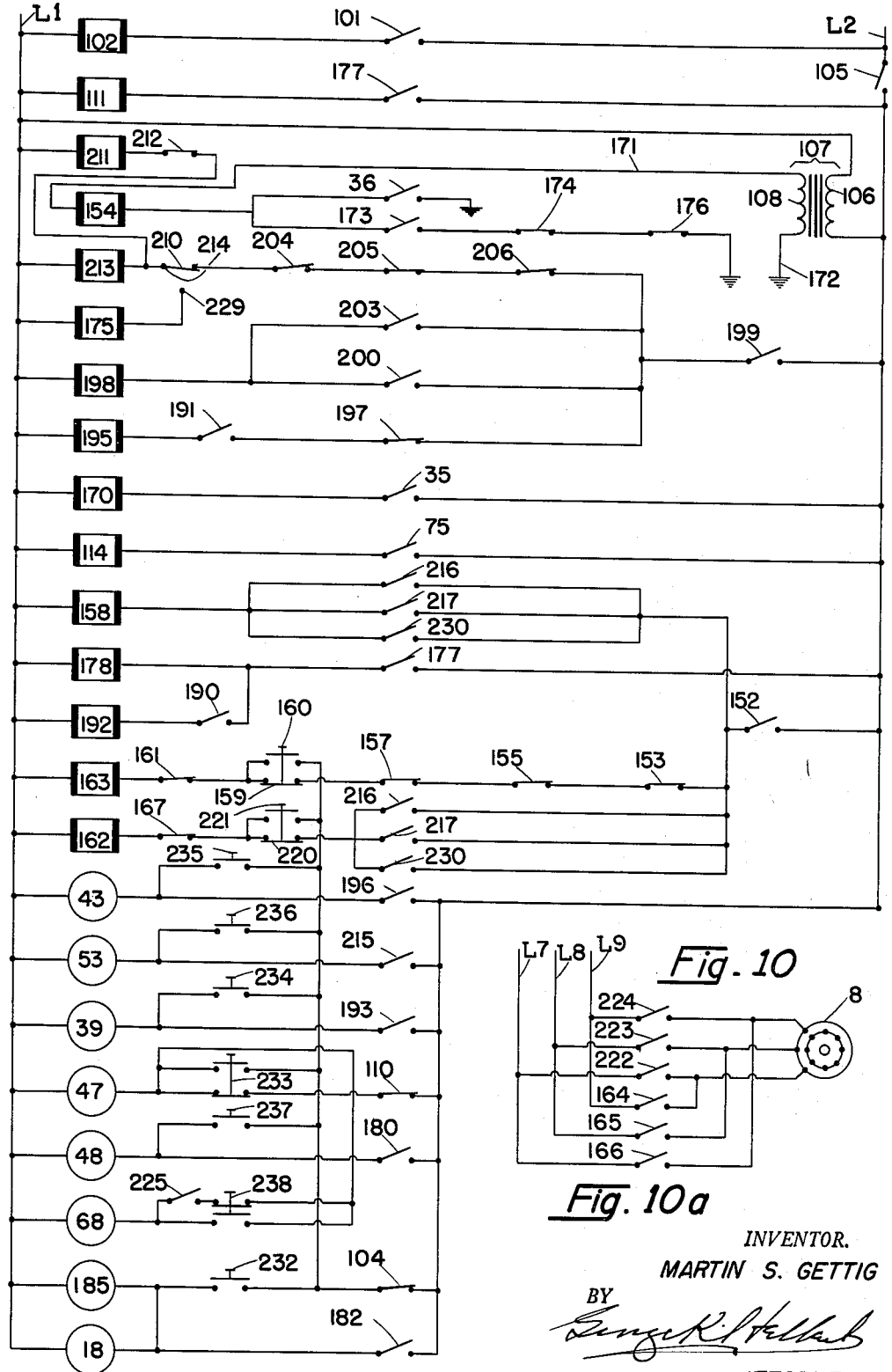
Figure 11:
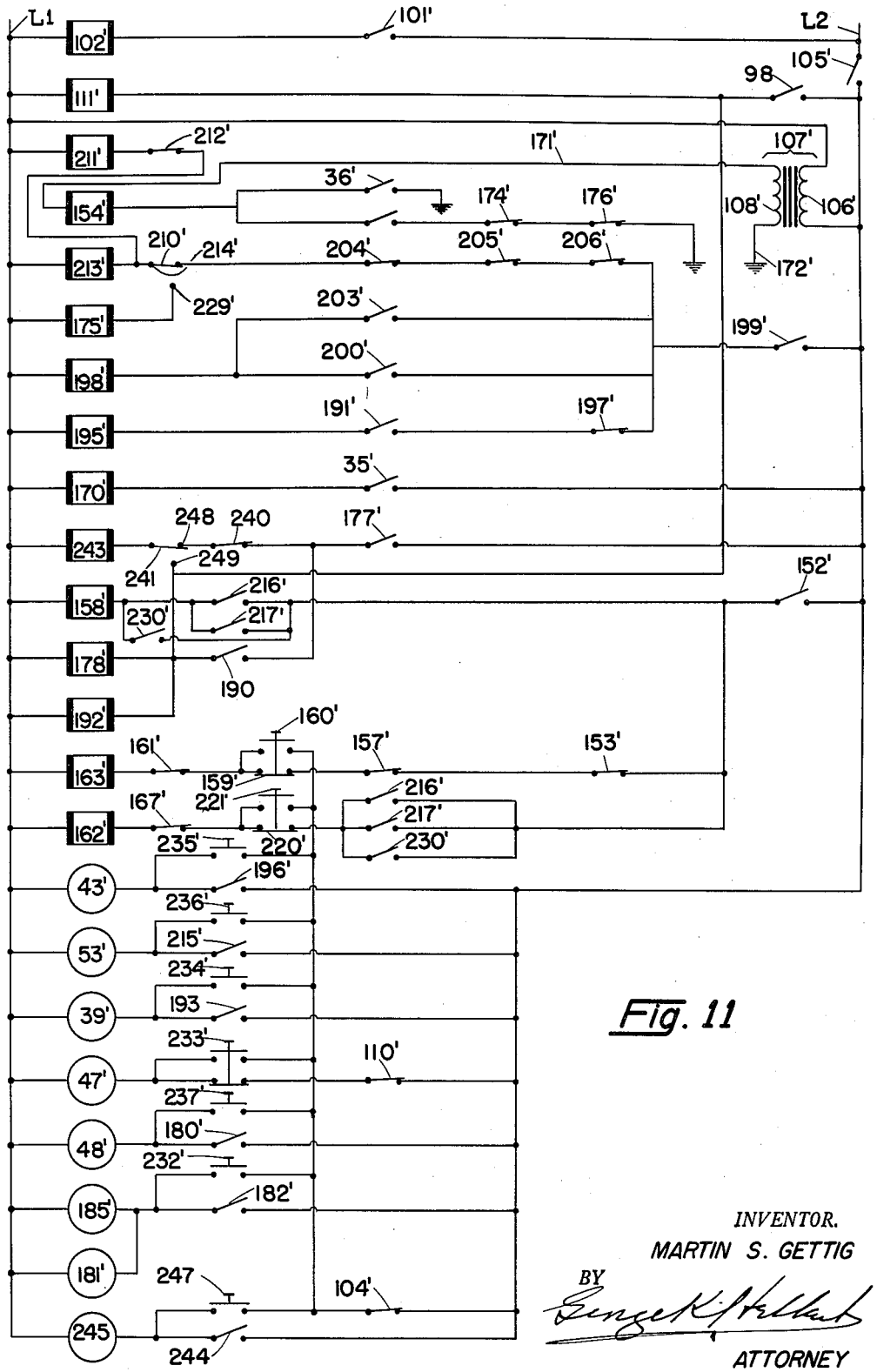

Figs. 10 and 10a are diagrams in which certain of the circuits of the several solenoids and other instrumentalities represented in Figs. 8 and 8b are simplified to facilitate reading of the latter and Fig. 11 is a similar diagram of many of the circuits in Figs. 9 and 9b. In the several wiring diagrams (Figs. 8–11) the solenoids of various electrical relays are represented by rectangular symbols while those which perform other work, such as operating fluid valves or the like, are represented by circles.

Referring now more particularly to the drawings I shall describe in detail first the mechanical and operating elements of the machine and their respective functions in carrying out the work the latter is designed to accomplish and thereafter the electrical and other instrumentalities utilized in accordance with my system for effecting their automatic actuation to perform such functions in properly timed and coordinated sequence.

The machine as illustrated comprises a plurality of substantially parallel inclined skids 1 supported on suitable pedestals 2 and constituting a charging table on which a bundle of pipes may be deposited as by a crane or the like for feeding by gravity into the lead unit of the machine. Lifting abutments 3 adjacent the lower ends of these skids are arranged for vertical reciprocation with a conveyor 4 of the lead unit comprising a plurality of rollers 5 mounted in a frame 6 and adapted to be rotatively driven in unison through suitable gearing from a shaft 7 actuated by a motor 8, the frame itself being movable vertically by operation of pivoted crank arms 9 connected to a reciprocal shaft 10 driven through pitman 11 from a motor 12 and reducing gear 13 whereby as the conveyor rises the abutments 3 pick up the nearest pipe and lifting it above fixed stops 14 transfer it by gravity to the conveyor rolls.

In alignment with the latter and vertically movable through spaces between adjacent ones within the side rails of the frame are several pairs of jack rolls 15 actuated by fluid cylinders 16 under the influence of a valve 17 controlled by a solenoid 18 the function of the jack rolls being to lift the pipe from the conveyor and support it for rotation about its longitudinal axis during one phase of the machine operation.

A flag switch 20 adjacent the lower edge of the charging table is positioned for depression by the leading pipe on the table to thereby operate an electrical contact 21 which is normally open when no pipes are on the table but is closed when the switch arm is depressed by a pipe resting upon it. Another switch 25 hereafter more fully described is actuated by the conveyor during its vertical reciprocating movements to control certain other circuits in the system.

Adjacent one end of the conveyor in substantial alignment with a pipe when positioned thereon with the conveyor rolls elevated is a pipe grip 30 into which the pipe is entered as the conveyor rolls are rotated to move it toward the right in Fig. 3; in entering the grip its end encounters and actuates a switch 35 the details of which will be described later and after passing through the grip it engages a contact 36 which is movable into and out of the path of the pipe under the influence of fluid cylinders 37 controlled by a valve 38 actuated by a solenoid 39; switch 35, contact 36 and their associated mechanisms forming elements of the automatic control system as will hereafter more fully appear. Between the grip 30 and the contact 36 are positioned cut off tool slides 40 controlled by a cylinder 41 under the influence of a valve 42 actuated by a solenoid 43, the cut off tools 44 carried by the slides being operative when moved oppositely radially inward into a pipe during its rotation under the influence of the grip to crop off the pipe end. A fluid operated cylinder 45 controlled by a valve 46 actuated in opposite directions by solenoids 47 and 48 respectively is provided for opening and closing the grip in timed sequential relation to the operation of other components of the machine and the grip is provided with independent rotating means (not shown) which rotate it continuously, whether it is open or closed, while the machine is in operation.

Adjacent the slides 40 are positioned a chamfer tool 50 operated by a fluid cylinder 51 under the control of a valve 52 actuated by solenoid 53 and also a reaming tool 55 operated by a fluid cylinder 56 likewise under control of the valve 52 whereby when the latter is actuated the chamfer tool 50 and reaming tool 55 may be simultaneously brought into play to operate respectively upon the outer and inner edges of the pipe end after it has been severed by the cut off tools 44. The slides 40 carrying the latter are as above noted controlled by cylinder 41 which actuates both a switch 60 forming a component of the system and a valve 61 which controls the flow of fluid to and from a cylinder and piston (not shown) by which the slides are moved in and out. For convenience of illustration the several machining tools just mentioned are omitted in Figs. 3 and 4 but shown diagrammatically in Figs. 3a and 4a in elevation looking toward the left and right respectively in Figs. 3 and 4.

Positioned at the opposite end of the conveyor from the cutoff, chamfer and reaming tools is a movable rear-end stop 65 operated by a cylinder 66 under the control of a valve 67 actuated by a solenoid 68 whereby the stop is advanced at the appropriate time to limit rearward movement of the pipe on the conveyor 4 and prevent it from passing beyond its proper position longitudinally with respect to the lag unit to which it is transferred laterally after its discharge from the conveyor. The latter includes discharge skids 70 having inclined surfaces which receive the pipe when the conveyor is lowered and automatically discharge it therefrom by gravity to a transfer table 71, the pipe in its passage thereto actuating a switch 74 having a normally open contact 75 which should the transfer table be full so the pipe just discharged cannot roll beyond it therefore remains closed until the condition is changed; effects of this switch as an element of the system will be more fully considered hereafter.

The lag unit at the other side of the transfer table embodies substantial duplicates of several of the mechanisms just described, including a conveyor 4', pipe grip 30', cut off tools 44', chamfer tool 50' and reaming tool 55' with actuating mechanisms therefor generally similar to those of their respective counterparts in the lead unit; it does not, however, have associated with it a pipe stop and actuating mechanism similar to the stop 65 since this stop is supplied at the lead unit solely to insure proper positioning of the pipes for reception by the lag unit. The several other elements in the latter equivalent to those in the lead unit are designated in the drawings by the same reference characters with the addition of a prime (') and do not require specific description; those peculiar to the lag unit are designated by their respective individual reference characters and will be described in greater detail as the explanation proceeds.

While the operations of the lag unit in receiving a pipe on the conveyor 4' and introducing it into the grip 30' are in general substantially similar to the corresponding operations of the lead unit, in accordance with the present invention the lag unit comprises means for moving the pipe into exactly the proper position in relation to the cut off tools 44' after the conveyor has been stopped as a result of contact of the pipe with movable contact 36' said means including pusher mechanism comprising a main supporting beam 80 carried on a pedestal 81 at one end of the machine and at its other end supported by housing 82 of the grip mechanism through pivoted links 83.

This beam supports a movable carriage 85 from rollers 86 engaging the lower beam flanges 87 and a locking bolt 88 engageable with the frame of the carriage for securing the latter longitudinally with respect to the beam on its insertion in a selected one of a series of holes 89 arranged in a rectilinear row along the web of the beam. The beam web also carries a rack 90 meshing with a pinion 91 on the carriage adapted to be rotated by engagement with the squared end of its shaft 92 of a manual or mechanical wrench (not shown) whereby the carriage can be moved in either direction longitudinally of the beam when the bolt 88 is removed. The carriage 85 includes a reciprocable slide block 93 pivotally supporting a pusher arm 94 and actuated from a piston rod 95 in a cylinder 96 supported from the carriage whereby the block may be reciprocated longitudinally with respect to the latter, and a movable stop 97 at one end of the carriage is adapted to actuate a switch 98 when engaged by the block 93 at the end of its forward travel. The pusher arm 94 is pivoted in the block 93 and engages a stop 99 when the block is retracted, thereby lifting the pusher arm out of the path of an incoming pipe on its way from the transfer table to conveyor 4', the arm falling by gravity upon advancement of the block after the pipe has been moved forwardly into the grip 30' by operation of the conveyor. When the pusher arm thereafter engages the end of the pipe it moves the latter longitudinally on the conveyor until the block reaches the limit of its travel thus bringing the section to a predetermined position relatively to the cut off tools 44' such that they will sever the pipe to the proper length regardless of its initial length, the ultimate length being predetermined by the setting of the carriage along the beam since at a given setting the block and hence the pusher arm moves to the same position in engagement with each pipe and each pipe is therefore cut by the cut off tools at exactly the same distance from its opposite end preparatory to reaming and chamfering, its said opposite end having previously been finished in the lead unit.

As in the operation of the lead unit, after the second end of the pipe has been cut, reamed and chamfered in the lag unit the grip 30' is released, jack rolls 15' lowered, conveyor 4' reversed and the pipe retracted from the grip; it is then discharged into a receiving bin 100 through operation of discharge skids 70' associated with the conveyor 4' as the latter is lowered preparatory to receiving the following pipe.

While not all the switches and other instrumentalities affecting or influenced by the pipes in their passage through the machine have been specifically referred to thus far it is believed the operation of the machine in general will be readily understood from what has been said and the instrumentalities forming elements of the control system as well as their operation in automatically causing the machine elements to function in properly timed sequential order will now be more fully described, abbreviations NOC and NCC being employed for convenience to identify respectively "normally open" and "normally closed" electrical contacts.

Referring now to the electrical control system represented in the circuits shown in Figs. 8-11 inclusive in which the several instrumentalities are diagrammatically illustrated with the system in fully deenergized condition and hence as in the absence of any pipe in the machine, it will be appreciated that before initiating the operation of the latter certain manually operated switches (not shown) controlling the main circuits utilized in the system must be closed to connect the system therewith. In Figs. 8, 8a and 8b illustrating the circuits and associated instrumentalities controlling the lead unit the principal energizing circuit supplies 220 volt A. C. through the leads L1, L2 and is controlled by a manually operated switch 101 which is closed to initiate automatic operations while independent 250 volt D. C. circuits through leads L3, L4 and L5, L6 respectively as well as 220 volt 3-phase A. C. circuit of leads L7, L8 and L9 are assumed to be connected with respectively corresponding energy sources. The closing of the switch 101 activates the main automatic control circuit by energizing the solenoid of a relay 102 having one pair of NCC 103 and 104 through which circuits may be completed to permit the machine as a whole to be operated by manual control if desired on suspension of automatic operation, but when the relay 102 is energized through closing of the switch 101 the "manual" circuits cannot be energized through the manual controls and operation of the machine otherwise than by the automatic control system is prevented.

Relay 102 being energized, its NOC 105 in closing energizes the primary winding 106 of a transformer 107 effective to convert the 220 volt A. C. supplied from leads L1, L2 through this contact to 10 volt A. C. and thus supply from its secondary winding 108 a low voltage current for a subsidiary control circuit. NOC 105 of the relay 102 on closing also completes a circuit through NCC 110 of a relay 111 to energize solenoid 47 operating the grip cylinder control valve 46 to open the grip 30 if it is not already open and thereafter to hold it open until relay 111 is energized and this circuit therefore interrupted.

When a bundle of pipes are first deposited on the charging table skids one rolls toward the conveyor to actuate switch 20 so if its NOC 21 is already closed by a pipe on the skids at the closing of switch 101, or thereafter upon subsequent actuation of the switch 20, a 250 volt D. C. circuit of leads L3, L4 through NOC 112 of relay 102, NCC 113 of a relay 114 and NOC 21 energizes the solenoids of relays 115 and 116, and also through NCC 117 of switch 25 the solenoid of a relay 120, NOC 121 and 122 of relays 115 and 116 respectively on closing thus energizing the conveyor lift motor 12 from 250 volt D. C. leads L5 and L6. This motor, which includes an accelerating resistance 130, a series brake 131 inactive when energized and a series field 132 connected in series with its armature 134 has a shunt field 135 energized directly from the main D. C. supply L5, L6 and under the control only of a manual switch (not shown) interposed in the leads L5 and L6 which are kept energized throughout the operational period of the machine. On closing of NOC 121 and 122 by the relays 115 and 116 the table lift motor 12 is therefore set in motion to start the table moving upward.

Energization of relay 120 simultaneously with the energization of relays 115 and 116 opens its NCC 140 and closes its NOC 141 the former controlling resistance 142 which is shunted across the armature of the lift motor to assist in stopping it while the latter energizes the solenoids of relays 145 and 146, which are of such character that shortly after the energization of the table lift motor they successively operate to close their NOC 147 and 148 to shunt out complementary portions of the accelerating resistance 130 progressively as the motor approaches its normal operating speed.

As the lift motor is energized it raises the conveyor and thereby actuates the switch 25 two NCC 117 and 150 of which are in the circuits controlling the lift motor and open progressively during movement of the conveyor upwardly to receive a pipe from abutments 3; NCC 117 first opens the circuit through the solenoids of relays 120, 145 and 146 to shunt the resistance 142 across the armature 134 through NCC 140 and to deenergize relays 145 and 146 which allow their NOC 147 and 148 to open and thereby interpose in the motor armature and series field circuit the entire accelerating resistance 130 to reduce the speed of the motor as the conveyor 4 approaches proper elevation to bring the pipe thereon into substantial axial alignment with the grip 30.

NOC 151 of relay 115, closing with the initial energization of this relay through flag switch 20 NOC 21 provides a holding circuit for the said relay as well as relay 116 through NCC 150 of the conveyor actuated switch 25 and NOC 105 of the relay 102 thereby keeping the relays 115 and 116 energized while the succeeding pipe on the charging table is prevented by the abutments 3 from rolling down the table to actuate the flag switch 20 as the abutments rise with the conveyor to deposit the preceding pipe thereon, NOC 151 affording such holding circuit also when the pipe being lifted by the conveyor leaves the charging table empty.

As the conveyor attains its maximum elevation and actuates the switch 25 it causes NCC 150 to open and thereby deenergize the holding circuit of relays 115 and 116 to open their NOC 121, 151 and 122 and thereby stop the conveyor lift motor, interruption of its armature circuit occurring simultaneously with deenergization of the series brake so the latter supplemented by the dynamic braking effect of resistance 142 shunted across armature 134 through NCC 140 of relay 120 at this point automatically acts to stop the motor shaft and the brake thereafter holds it stationary.

At about this same time NOC 152 of switch 25 closes to establish a 220 A. C. volt circuit from leads L1, L2 through NOC 105 of relay 102 NCC 153 of a relay 154, NCC 155 of relay 114, NCC 157 of a relay 158, NCC 159 of a manually actuated conveyor roll motor control switch 160, NCC 161 of a conveyor roll motor control relay 162 and the solenoid of a second conveyor roll motor control relay 163. Energization of this latter relay closes its three NOC 164, 165 and 166 in the 220 volt 3-phase AC system through leads L7, L8 and L9 energizing the conveyor roll motor 8 in a forward direction to cause the conveyor rolls 5 to move the pipe axially through the grip 30 and bring its forward end within the zone of action of the cut off, ream and chamfer tools; to avoid a short circuit across the 220 volt 3-phase A. C. supply NCC 167 of relay 163 opens upon energization of the latter and prevents the conveyor reversing relay 162 becoming accidentally energized while the forward relay 163 is energized.

As the pipe travels forwardly on the conveyor its leading end successively engages and actuates flag switch 35, passes through the grip 30 and engages insulated pipe contact 36 disposed in its path at a position suitably related to the position of the cut off and ream and chamfer tools to enable the latter to act upon the pipe when later brought into play. As the pipe actuates flag switch 35 its NOC energizes the solenoid of a relay 170 and thereafter engaging contact 36 it grounds on the machine an insulated lead 171 of the 10-volt transformer secondary circuit through the solenoid of relay 154; as the other lead 172 of the transformer secondary is also grounded on the machine the relay 154 is thereupon energized, opening NCC 153 to interrupt the circuit through the solenoid of relay 163 and thereby bring the conveyor roll motor 8 to rest. NOC 173 of the relay 154 provides a holding circuit for its solenoid through NCC 174 of a relay 175 and grounded NCC 176 of relay 158 while NOC 177 of relay 154 causes the solenoids of relay 111 and another relay 178 to be energized from the main 220 volt A. C. supply through NOC 105 of relay 102.

Energization of the solenoid of relay 111 interrupts the circuit through its NCC whereby the grip opening solenoid 47 has previously been kept energized, leaving the grip free and hence conditioned to clamp the pipe by operation of automatic controls and mechanisms now to be described.

To this end NOC 180 of relay 111 is connected in circuit through NOC 105 of relay 102 with grip closing solenoid 48 so that when the relay 111 is energized as just mentioned the valve 46 controlling the grip jaw operating cylinder 45 is actuated to cause the grip to close upon the pipe and securely clamp it in non-rotatable relation with the continuously rotating grip. Concurrently with this clamping of the pipe in the grip, NOC 182 of relay 111 establishes a circuit through NOC 105 of relay 102 and each of two solenoids 185 and 18 connected in parallel in this circuit, the latter actuating valve 17 controlling the flow of fluid to the cylinder 16 to elevate the jack rolls 15 and thereby lift the pipe from the conveyor, the jack rolls supporting it for axial rotation free of the conveyor so it can rotate with the grip when the latter is secured upon it. Solenoid 185 is connected in parallel with the solenoid 18 and hence energized simultaneously therewith actuates certain other mechanism as will hereafter more fully appear.

As noted, energization of the solenoid of relay 178 is effected through NOC 177 of relay 154 upon the latter being energized through contact of the pipe with the insulated contact 36; this relay 178, provided with two NOC 190 and 191, is so designed as to operate them in timed sequence after energization of its solenoid, closing NOC 190 substantially instantaneously and NOC 191 after a suitable period of delay. Through NOC 190 the solenoid of a relay 192 is energized and NOC 193 of the latter thereupon energizes solenoid 39 to actuate the fluid valve 38 controlling the cylinder 37 to move the insulated contact 36 out of the path of the pipe. NOC 191 of relay 178 thereafter establishes a second circuit through the solenoid of a relay 195, NOC 196 of which thereupon closes a circuit through NOC 105 of relay 102 and solenoid 43 which actuates the cut off slides 40 through the medium of a fluid valve 42 operated by the solenoid 43 and fluid cylinder 41, the relay 195 circuit being completed through NCC 197 of a relay 198 and NOC 199 of relay 170.

The cut off slides in their normal operating cycle of moving cut off tools 44 in toward the pipe and then retracting them after they have cropped its end also actuate switch 60, NOC 200 of which thereupon energizes the solenoid of relay 198 through the now closed NOC 199 of relay 170. As the relay 198 is energized its NCC 197 opens to interrupt the circuit through the solenoid of relay 195 and thereby open the circuit through NOC 191 and solenoid 43 while NOC 203 provides a holding circuit for solenoid 198 through the NOC 199 as NOC 204, in series with the NCC 205 and 206 of the switch 60, closes to prepare a circuit which the operator by manually actuating a double throw switch 210 may complete to cause the machine to omit the ream and chamfer operations which follow the cut off operation in the normal automatic sequence of the system.

Assuming however the normal operation of the system is not superseded in this manner, energization of a relay 211 through NCC 212 of a relay 213, "automatic" contact 214 of switch 210, NOC 204 of relay 198, NCC 205 and 206 of switch 60, and NOC 199 of relay 170 occurs as the relay 198 is energized, and NOC 215 of relay 211 energizes solenoid 53 which controls the valve 52 actuating the chamfer and reamer tool operating cylinders 51 and 56; the said tools thereupon attack the end of the rotating pipe and bevel its outer and inner edges to the form determined by the shape of the tools in the customary manner.

Closing of the circuit through the solenoid of relay 211 also energizes the solenoid of relay 213 which is so constructed as to close its NOC 216 and to open its NCC 212 to interrupt the circuit through the solenoid of relay 211 successively and only after the lapse of a sufficient period of time to enable the ream and chamfer tools to carry out the cycle of their operations, at the conclusion of which said relay 211 automatically deenergizes solenoid 53 and the latter actuates its valve 52 to retract the tools from the pipe which is now ready for release by the grip and retraction from the zone of operation of the tools preparatory to its transfer to the lag unit.

NOC 216 of relay 213 in closing energizes the solenoid of relay 158 the grounded NCC 176 of which then opens to interrupt the 10-volt holding circuit of the solenoid of relay 154, and the other NCC 157 of relay 158 opens to prevent the NCC 153 of relay 154 upon its deenergization reestablishing the energizing circuit of relay 163. As relay 154 is deenergized its NOC 177 deenergizes the solenoid of relay 111 and its NCC 110 thereupon energizes solenoid 47 causing the grip to open and release the pipe while NOC 182 of relay 111 opens to deenergize the solenoids 185 and 18, the latter thereupon allowing the jack rolls to descend and deposit the pipe on the conveyor. As solenoid 185 when energized with solenoid 18 at the raising of the jack rolls merely operates to move the mechanism housing switch 35 away from the pipe during work upon it, on being deenergized it allows the said mechanism to return to its original position preparatory to withdrawal of the pipe from the grip.

The pipe is lowered by the jack rolls to the conveyor as the solenoid 185 is deenergized and the NOC of switch 35 is closed thereby on return of the switch to its normal position but the resulting energization of the solenoid of relay 170 has no immediate effect upon the remaining circuits at this point in the cycle. The effects of its subsequent deenergization upon withdrawal of the pipe from the grip 30, releasing NOC of switch 35 will hereafter appear.

Both NOC 216 of relay 213 and NOC 217 of relay 158 in closing as the relays are energized establish a circuit through NOC 152 of switch 25, NCC 220 of manual conveyor roll motor switch 221, NCC 167 of relay 163 and the solenoid of relay 162 closing its NOC 222, 223 and 224 in the 220 volt 3-phase A. C. circuit thus energizing the conveyor roll motor 8 in the reverse direction to retract the pipe and clear it from grip 30 while a supplemental NOC 225 of relay 162 energizes solenoid 68 to move the stop 65 to upright position and prevent the pipe being retracted too far. As it leaves the grip and its then trailing end passes beyond the switch 35 the NOC of the latter opens and deenergizes the solenoid of relay 170 and as the solenoid of relay 158 remains energized the deenergization of relay 170 therefore establishes a circuit through its NCC 227 and NOC 228 of relay 158 to energize relays 115 and 116 and start the conveyor lift motor 12 operating to lower the conveyor.

The conveyor lift motor 12 is energized in the manner heretofore described for raising the table upon energization of the relays 115 and 116 since it acts through pitman 11 and a crank and thus does not require reversing to reciprocate the table. As the conveyor descends, depositing the pipe, now finished at one end, on skids 70 on which it rolls to the transfer table, it actuates switch 25 to open NOC 152 and close NCC 117 and 150, the latter providing a circuit through which the lift motor is later energized to complete a succeeding cycle after NOC 152 has opened to deenergize relay 158, while NCC 117 energizes relay 120 which through NOC 141 energizes relays 145 and 146 as well, successively shunting out parts of the resistance 130 through NOC 147 and 148 as the motor accelerates. Resistance 142 is cut out of the circuit of armature 134 by opening of NCC 140 of relay 120 until NOC 152 opens as the conveyor attains substantially its lowest point to deenergize relays 115, 116, 120, 145 and 146 resulting in interposition of the resistance 142 across the armature 134 to contribute a dynamic stopping effect to the braking of the motor shaft by the series brake 131 as the driving circuit in motor 12 is interrupted. The cycle is automatically repeated when the next succeeding pipe rolls from the charging table on to the abutments 3 which descend with the conveyor whereas if no succeeding pipe is on the charging table switch 21 remains open and the control system for the lead unit remains deenergized until a pipe subsequently deposited on the table actuates the said switch.

Reference has been made to the manual switch 210 having two contacts only one of which, 214, has been utilized in the circuits thus far described. The other contact 229 enables the relay 175 to be energized through NOC 204 of relay 198, NCC 205 and 206 of slide switch 60 and NOC 199 of relay 170 when both the latter relays are energized following completion of the cut off operation and return of the cut off slides 40 to retracted position after cutting off the pipe end. NCC 174 of relay 175 now breaks the 10-volt holding circuit of relay 154 while NOC 230 of the former relay energizes the solenoids of relays 158 and 162 which thus act to release the pipe grip, lower the jack rolls and reverse the conveyor motor 8 substantially immediately after the cutting off operation without permitting the solenoid 53 to be energized to actuate the ream and chamfer tools.

At the transfer table 71 flag switch 74 having NOC 75 in series with the solenoid of relay 114 provides means whereby if for any reason the transfer table becomes too heavily burdened with pipes, as when operation of the lag unit is interrupted without correspondingly interrupting operation of the lead unit, the operation of the latter is temporarily suspended since when the relay 114 is thus energized the circuits dependent upon its NCC 113 and 155 for completion cannot be made. Removal of the pipes from the transfer table to an extent sufficient to enable NOC 75 to open and deenergize the solenoid of relay 114 of course permits resumption of operation of the lead unit.

Reference has been made to manual operation and circuits which may be employed therefor and it will be evident from Figs. 8, 8a and 8b that when the automatic control master switch 101 is open and relay 102 therefore deenergized the conveyor lift motor 12 may be energized by operation of the manual push button type switch 231, the conveyor forward solenoid 163 by double throw switch 160, the jack roll solenoid 18 by switch 232, grip closing solenoid 48 by switch 237, stop actuating solenoid 39 by switch 234, cut off solenoid 43 by switch 235, chamfer and rear solenoid 53 by switch 236, grip opening solenoid 47 by double throw switch 233, rear end stop solenoid 68 by double throw switch 238 and conveyor reverse solenoid 162 by double throw switch 221 whereby the several operations incident to the performance of its work by the lead unit may be carried out by an operative having the requisite skill to manipulate these several switches in proper sequence and with sufficiently accurate timing to secure acceptable performance.

In Figs. 9 and 9b circuits substantially corresponding to many of those just described but relating to the lag unit are illustrated and it is necessary only to refer herein to the differences between those of Figs. 8, 8b and 9, 9b which include omission of any mechanisms exactly corresponding to the switch 75, relay 114, rear end stop 65 and its actuating mechanism and the addition of a second NCC 240 to the relay 111' corresponding to relay 111 as well as a manual switch 241 having two positions, a relay 243 with one NOC 244 controlling a solenoid 245 and NOC limit switch 98 the functions of which will hereafter more fully appear.

As has been indicated the lag unit includes means for mechanically pushing the pipe along the conveyor 4' after the conveyor rolls 5' have been stopped and for limiting the distance it is moved beyond the lag unit grip 30' so as to cause its previously finished end to stop at a predetermined distance from the plane of operation of the lag unit cut off tools 44' whereby the latter reduce each pipe to the exactly same length corresponding to a given setting of the pusher mechanism. This mechanism is actuated from a solenoid 245 energized through NOC 244 of relay 243 or in the alternative by operation of a manual push button switch 247 when automatic operation is suspended. The switch 241 in circuit with the solenoid of the latter relay in one of its two positions, on contact 248, is moved to another contact 249 for suspending operation of solenoid 245 when the pusher mechanism is not to be used. When it is in use the slide block 93 of the pusher mechanism actuates limit switch 98 at the extremity of its travel and moves to the same position in engagement with each pipe at any adjustment of the carriage 85 so all pipes are cut to the same length by the cut off tools 44', preparatory to reaming and chamfering, in the manner heretofore described with reference to the lead unit, the NOC of limit switch 98 holding the relay sequence operations of the lag unit in abeyance after forward motion of the conveyor is stopped until the pipe is properly positioned; hence it is believed no further or more detailed description of the lag unit is required.

As will be apparent from the foregoing a machine comprising my control system is adapted to automatically and sequentially finish both ends of a continuous or intermittent series of pipes, tubes or the like without external assistance or attention, reducing each to exactly the same length as all the others regardless of whatever non-uniformity in their length may obtain prior to operation of the machine upon them assuming of course that all are initially longer than the length to which they are to be finished, and it is necessary only that the charging table skids 1 be kept supplied with unfinished pipes and finished ones be removed from time to time from the receiving bin 100. Moreover as each is received and its ends operated upon in exactly the same way as the others, after finishing they may be transferred to a threading machine with assurance of uniformity of threading operations upon them and consequent minimization of damage to the threading machine or other untoward consequences; when they are to be used unthreaded as when butt welded joints are to be employed for joining together a plurality of them, the uniformity of their ends greatly facilitates the welding operations and insures satisfactory joints. Thus my control system obviates the variations both in pipe length and in end finish which are substantially unavoidable when manual controls for the several elements of the machine are relied upon, and as the pipes automatically succeed each other in their progress through the machine as rapidly as they can be machined thereby, interruptions and delays are also eliminated and the volume of production correspondingly increased.

As has been stated, the invention is of particular adaptability to incorporation in and control of machines of the general character exemplified by the one diagrammatically illustrated in the drawings and herein described in general terms and I have therefore explained it herein more especially with reference to such a machine but without in any way intending to thereby restrict its application and use thereto, since my system may be employed with equal facility and advantage for the automatic control of machines of generally similar type adapted to perform operations other than cutting off, reaming and chamfering the ends of pipes or the like as well as of machines of different type designed for machining or otherwise finishing the ends of pipes and the like.

Moreover, the principles of operation of my invention as well as the specific instrumentalities and the arrangement thereof utilized in their application are susceptible of modification in many ways within the scope of the appended claims either to adapt the system to the control of machines of differing construction or for other reasons, and I do not therefore limit or confine myself in the practice of the invention to the employment and/or disposition of the particular ones to which I have herein referred.

Having thus described my invention, I claim and desire to protect by Letters Patent of the United States:

1. In a machine for finishing the ends of an elongated cylindrical work piece including first and second sets of machining tools respectively adapted to operate upon the ends of the piece during its axial rotation, means for transferring the piece from a position in registry with the first tool set to a position in registry with the second tool set including means for moving the piece longitudinally and elevating means aligned with each set for supporting the piece for axial rotation, that improvement which includes the combination of means engaged by the work piece to complete a circuit therethrough when it is moving longitudinally in the vicinity of the first tool set, means energized from said circuit for causing the elevating means to support the piece for axial rotation and for initiating the attack thereon by said first tool set, means for positioning the piece longitudinally with respect to the second tool set comprising a horizontal beam, a wheeled carriage supported thereby and movable longitudinally thereof, a longitudinally reciprocal block supported by the carriage and having a work piece engaging pusher arm and means positioned beyond the limit of travel in one direction of the block when in engagement with the work piece for initiating machining operations thereon after the piece has been positioned by the pusher arm with that end of the piece previously operated upon by the first tool set disposed at a predetermined distance from the second tool set and means adapted to complete a circuit through the piece when engaged by the other end thereof to thereby activate said positioning means and to cause the second elevating means to support the piece rotatably about its axis for operation thereon by said second tool set at a predetermined distance from the end thereof previously operated upon by the first tool set.

2. In a machine for finishing the ends of an elongated cylindrical work piece including first and second sets of machining tools respectively adapted to operate upon the ends of the piece during its axial rotation, means for transferring the piece from a position in registry with the first tool set to a position in registry with the second set including means for moving the piece longitudinally and elevating means aligned with each set for supporting the piece for axial rotation, that improvement which includes the combination of means engaged by the work piece to complete a circuit therethrough when it is moving longitudinally in the vicinity of the first tool set, means energized from said circuit for causing the elevating means to support the piece for axial rotation and for initiating the attack thereon by said first tool set, means for positioning the piece longitudinally with respect to the second tool set comprising a pusher arm, a carriage supporting the arm for movement longitudinally with respect thereto, rollers on the carriage, a substantially horizontal beam supporting the carriage from the rollers and means for selectively positioning the carriage longitudinally of the beam, and means adapted to complete a circuit through the piece when engaged by the other end thereof to thereby activate said positioning means and to cause the second elevating means to support the piece rotatively about its axis for operation thereon by said second tool set at a predetermined distance from the end thereof previously operated upon by the first tool set.

3. In apparatus of the class described comprising a conveyor for supporting an elongated cylindrical work piece for longitudinal movement and means adjacent one end of the conveyor for machining the piece, means movable in parallelism with the piece on the conveyor engageable with one end thereof for moving it longitudinally on the conveyor, said movable means including a horizontally slidable block and an arm pivotally supported therefrom, a fluid cylinder including a piston operative to reciprocate said block, and means engageable by the block at one extremity of its travel for initiating operation of the machining means upon the work piece, means disposed at a predetermined distance from said machining means for limiting movement of said movable means when said end of the piece has attained a predetermined position with relation to said machining means and means for supporting the movable means comprising a flanged beam overlying the conveyor, a carriage movable along the beam and means for releasably securing the carriage to the beam.

4. In apparatus of the class described comprising a conveyor for supporting an elongated cylindrical work piece for longitudinal movement and means adjacent one end of the conveyor for machining the piece, means movable in parallelism with the piece on the conveyor engageable with one end thereof for moving it longitudinally on the conveyor, said movable means including a horizontally slidable block and an arm pivotally supported therefrom, a fluid cylinder including a piston operative to reciprocate said block, and means engageable by the block at one extremity of its travel for initiating operation of the machining means upon the work piece, means disposed at a predetermined distance from said machining means for limiting movement of said movable means when said end of the piece has attained a predetermined position with relation to said machining means, supporting means for the horizontally slidable block including a carriage providing ways for the block and a stop operative to swing the arm on its pivot in one direction during movement of the block toward one extremity of its travel and means carried by the block for limiting swinging movement of the arm in the other direction during movement of the block toward the other extremity of its travel.

5. In apparatus of the class described comprising a conveyor for supporting an elongated cylindrical work piece for longitudinal movement and means adjacent one end of the conveyor for machining the piece, means movable in parallelism with the piece on the conveyor engageable with one end thereof for moving it longitudinally on the conveyor, said movable means including a horizontally slidable block and an arm pivotally supported therefrom, a fluid cylinder including a piston operative to reciprocate said block, and means engageable by the block at one extremity of its travel for initiating operation of the machine means upon the work piece, means disposed at a predetermined distance from said machining means for limiting movement of said movable means when said end of the piece has attained a predetermined position with relation to said machining means, and means for supporting said movable means comprising a flanged beam, a carriage movable along the beam, a rack secured to the beam and a pinion meshing with the rack and carried by the carriage operable on its rotation to move the carriage along the beam.

References Cited in the file of this patent

UNITED STATES PATENTS

| 1,285,584 | Baines | Nov. 26, 1918 |
| 1,419,936 | Ladd | June 20, 1922 |
| 1,967,153 | McCreary | July 17, 1934 |
| 2,210,531 | Engelbaugh | Aug. 6, 1940 |
| 2,359,167 | Somes | Sept. 26, 1944 |
| 2,360,906 | Smith | Oct. 24, 1944 |
| 2,405,141 | Hibbard | Aug. 6, 1946 |
| 2,519,837 | Lampard | Aug. 22, 1950 |
| 2,620,875 | Edwards | Dec. 9, 1952 |
| 2,690,572 | Thompson | Oct. 5, 1954 |